United States Patent

[11] 3,563,314

| [72] | Inventor | Bobby G. Harnsberger |
| | | Houston, Tex. |
| [21] | Appl. No. | 835,225 |
| [22] | Filed | June 20, 1969 |
| [45] | Patented | Feb. 16, 1971 |
| [73] | Assignee | Texaco Inc. |
| | | New York, N.Y. |

[54] SAND CONSOLIDATION METHOD
8 Claims, No Drawings

| [52] | U.S. Cl. | 166/295 |
| [51] | Int. Cl. | E21b 33/138 |
| [50] | Field of Search | 166/295; |
| | 260/67, (Shell Mold Digest) (Inquired), (Chem. Abstracts) | |

[56] References Cited

UNITED STATES PATENTS

| 2,573,690 | 11/1951 | Cardwell et al. | 166/295 |
| 2,944,034 | 7/1960 | Baird | 260/67X |
| 3,310,111 | 3/1967 | Pavlich et al. | 166/295 |
| 3,478,824 | 11/1969 | Hess et al. | 166/295 |

*Primary Examiner*—Marvin A. Champion
*Assistant Examiner*—Ian A. Calvert
*Attorneys*—K. E. Kavanagh and Thomas H. Whaley

ABSTRACT: Method of and composition for the treatment of unconsolidated sandy formations to stabilize the formation comprising injecting a treating composition comprising an aqueous solution containing from about 15 to about 50 percent by volume of 2-hydroxyadipaldehyde into said formation, effecting polymerization of said adipaldehyde by contact with an acid forming polymerization catalyst, and formation of a fluid permeable consolidated sand in said formation. The adipaldehyde solution may include a silane bonding agent.

SAND CONSOLIDATION METHOD

The present invention relates to the treatment of permeable underground formations. More particularly, the present invention relates to a method of treating permeable underground oil and/or gas containing formations to stabilize the sandy portion thereof.

The recovery of fluids such as gas and/or oil from underground formations has been troublesome in areas wherein the underground formation is composed of one or more incompetent sand containing layers or zones. The sand particles in the incompetent zone and/or layer tend to move or migrate to the well bore during recovery of the formation fluids from the particular zone and/or layer and frequently the moving sand particles block the passageways leading to the well bore. Plugging or materially impairing the flow of the formation fluids toward the bore hole results in a loss of these fluids to the producer or so decreases the rate of oil recovery from the well as to cause the well to be shut down because it is economically unattractive to continue to produce therefrom. An additional adverse factor resulting from the movement of the sand particles toward the well bore is that they are often carried along with the formation fluids to the well bore and passed through the pipes, pumps, etc. being used to recover the formation fluids to the surface with resulting damage to the moving parts thereof as the said particles are very abrasive.

Many attempts have been made heretofore to prevent or decrease the flow of undesirable sand particles from the formation into the production tubing and associated equipment, such as by the placement of sand screens, filters, liners and so forth. These prior attempts have been unsuccessful for a number of reasons among which is that these mechanical devices fail to prevent completely the flow of the formation particles into the production equipment. In addition these devices interfere with various types of completion and workover operations. In recent years, the industry has attempted to avoid the difficulties encountered in the use of mechanical devices by employing various chemical compositions to effect consolidation of the underground incompetent formations. These methods have generally consisted of injecting into the underground formation polymerizable resinous materials which when subsequently polymerized form permeable barriers in the formation to prevent the sand particles from movement therethrough. However, this technique of sand consolidation has not met with widespread acceptance because of the inherent difficulties of effecting polymerization of the resinous materials in the formation to a degree sufficient to consolidate these underground formations and yet permitting the unobstructed flow of the desirable formation fluids therethrough. Further, the cost associated with these resin coating methods has been relatively high in comparison with the prior mechanical methods and the time required for resin polymerization is often rather lengthy at low temperatures.

By the method of the present invention one is able to treat effectively the underground formation to be stabilized in a rapid and efficient manner while minimizing the disadvantages of these prior art methods both mechanical and chemical.

One object of the present invention is to provide an improved method of treating underground sand containing formations to stabilize the incompetent formation. An additional object is to provide a fluid permeable consolidated formation sand between the loose formation sand and the well bore to prevent or to minimize the flow of unconsolidated sand particles therethrough while maximizing the flow of desired fluids and particularly petroleum hydrocarbons therethrough.

How these and other objects of the invention are accomplished will become apparent with reference to the accompanying disclosure. In at least one embodiment of the method of this invention at least one of the foregoing objects will be obtained.

It has now been discovered that an improved method of treating an incompetent sand containing underground formation comprises introducing into said formation a particular treating composition comprising an aqueous solution containing from about 15 to about 50 percent by volume of 2-hydroxyadipaldehyde, contacting said aldehyde in said formation with an acid polymerization catalyst to polymerize the said aldehyde and consolidate some of the formation sand. The resultant consolidated sand serves to prevent or to materially reduce the flow of the unconsolidated sandy particles therethrough while permitting the flow of desirable formation fluids at a substantially unimpaired rate.

In carrying out the method of the present invention the treating composition is pumped down the well bore under sufficient pressure to force the composition into the unconsolidated formation adjacent to or in reasonable proximity to the well bore. When the composition is suitably placed in the formation to be consolidated the adipaldehyde is polymerized by the acid polymerization catalyst.

On polymerization of adipaldehyde the polymer sets up and hardens and there is formed a fluid permeable consolidated sand that prevents or decreases the movement of sand particles therethrough into the well bore. After the polymerization and hardening, the well can be equipped for production, the formation fluids can be recovered therefrom by permitting these fluids to pass through the resulting formed consolidated sand in the formation into the well bore and recovered therefrom without the formation fluids being contaminated with the presence therein of unconsolidated sand particles.

The method of the present invention is particularly adaptable for use in any type of well completion but is generally used in a well wherein casing has been set and which has perforations therein at the desired intervals behind which the unconsolidated formation sands are located. Packers can be initially set above and below the perforated intervals to prevent the treating composition from passing into the nonisolated portions of the well and also to permit buildup of sufficient pressures on the said composition to force same through the perforations and into the formation without plugging up the well bore. After the treating composition has been forced through the casing perforations and into the unconsolidated sand formation and after the composition has come in contact with the acid polymerization catalyst to effect polymerization of the adipaldehyde, the well is usually closed in for a suitable period of time to permit the polymer to set and harden.

The treating composition useful in the method of the present invention must meet certain specific requirements. The concentration of adipaldehyde present in the aqueous treating composition can vary from about 15 to about 50 percent by volume, with excellent results being obtained at concentrations of between 20 and 40 percent and particularly at about 25 percent for the most effective results. Concentrations below about 15 percent are not desirable because the consolidation may be weak in compressive strength.

The balance of the treating composition is 85—50 percent by volume of water which can be partially replaced by an oxygenated lower aliphatic hydrocarbon solvent such as acetone or methyl-ethyl ketone. This oxygenated hydrocarbon solvent is used in an amount of from about 10 to about 70 percent by volume of the treating composition.

It is desirable to follow up injection of the treating composition into the formation with a displacement fluid to effect removal of excess solution from the sand particles and to extend the treating solution further into the formation.

Representative displacement fluids include kerosene and diesel oil fractions of petroleum crudes. Selected petroleum fractions suitable as the displacing fluid such as a kerosene or diesel fraction having a cetane number of at least about 45, an IBP of about 310° and an EP of about 530° F. or a naphthalene petroleum fraction from a topped catalytic reformate bottoms cut having an API Gravity of about 20°, an IBP of about 370° and an EP of about 750° F. The displacement fluid can be employed in an amount of from about 30 percent to about 400 percent by volume of the treating solution, preferably 100 to 300 percent.

The catalyst for use in the present invention must be one that on contact with the adipaldehyde will effect polymerization, particularly in the presence of water. Representative acid catalysts include inorganic acid halides such as thionyl chloride or sulfonyl chloride, organic acid halides such as benzoyl chloride, and benzenesulfonyl chloride. The halosilanes such as dichlorodimethylsilane or other chlorosilanes such as silicon tetrachloride are also satisfactory catalysts. Preferred catalysts are benzoyl chloride and benzenesulfonyl chloride or mixtures of either with thionyl chloride.

Use of benzoyl chloride or benzenesulfonyl chloride as the catalyst permits polymerization and consolidation of the sand particles in from about 1 to 3 hours at 140° F. With silicon tetrachloride, dimethyldichlorosilane, thionyl chloride and the like, one attains more rapid consolidation without the application of heat, but the size and permeability of the consolidation per given volume of consolidation fluid is reduced.

One can also employ mixed catalysts that would provide additional advantages in operation, i.e. with the rapid catalyst, polymerization of part of the adipaldehyde would take place at the perforations of the borehole and with the slower catalyst polymerization of the remaining portion of the adipaldehyde would occur out in the formation away from the well bore. By this method, one could thereby move the treating equipment from the well site before complete polymerization and curing of the polymer took place with a resultant saving of equipment waiting time.

The catalysts are employed in amount of from about 1.0 to about 5 percent by volume, of catalyst solution, preferably 2—4 percent by volume.

The catalyst is incorporated in a petroleum fraction such as kerosene or diesel oil in amounts of from 1.5 to 5 percent by volume, preferably 2—3 percent by volume, and the resulting solution is injected into the sands to be consolidated.

Rates of injection of the treating solution and the catalyst may vary from about one to about three gallons per minute per perforation. An injection rate of about 1.5 to 2.5 gallons is highly desirable.

Following is a description by way of example of the method of the present invention. In the examples the test procedure used is described below.

EXAMPLE 1

A 1 inch in diameter by 6 inches long glass tube was packed with a fine sand and fitted to permit fluids to be displaced into and through the sand.

The sand was treated with 50.2 ml. of a 25 percent aqueous solution of 2-hydroxyadipaldehyde including 0.2 mol. of a gamma-glycidoxypropyltrimethoxysilane as a bonding agent.

A 20 ml. portion of a diesel oil fraction having a cetane number of about 45 and a boiling point temperature range of about 310—530° F. was forced through the sand to displace any excess treating solution therefrom. Thereafter an additional 50 ml. of the diesel oil fraction containing 2.5 ml. of benzoyl chloride catalyst was forced into the sand to polymerize the aldehyde.

The resulting treating sand was maintained at a temperature of about 140° F. for 24 hours to effect curing. The treated sand was removed from the glass tube and cores were taken therefrom for water permeability and compressive strength measurements. It was found that the treated sand had a compressive strength of 790 p.s.i. and had retained about 67 percent of its original water permeability.

EXAMPLE 2

The procedure of Example 1 was repeated using 100 ml. of the diesel oil fraction as the displacing fluid instead of the 20 ml. used in Example 1.

The compressive strength of the sand core was found to be about 790 p.s.i. and about 95 percent of the original water permeability was retained after the 24 hour curing period.

When one desires to attain superior compressive strength in the consolidated sand formation, it is advantageous to employ a silane bonding agent such as gamma-glycidoxypropyltrimethoxysilane in the adipaldehyde treating solution. This material functions to improve the surface adhesion of the aldehyde to the sand grains so that the resultant polymer also has improved adhesion to these grains. The result is improved compressive strength in the consolidated sand. This material or other silane bonding agents of similar type is used in an amount of from about 0.5 to 3 percent of the adipaldehyde, preferably between about 1 and 2 percent.

Obviously, many modifications and variations of the invention as hereinbefore set forth may be made without departing from the spirit and scope thereof and therefore only such limitations should be imposed as are indicated in the appended claims.

I claim:

1. A method of treating an oil-containing incompetent formation penetrated by a well bore to prevent movement of unconsolidated sand particles from said incompetent formation to the well bore as the oil is recovered from said formation which comprises injecting an aqueous treating solution containing from about 15 to about 50 percent by volume of 2-hydroxyadipaldehyde into said incompetent sand formation, polymerizing the said adipaldehyde by an acidic catalyst, permitting the polymerized adipaldehyde to set and form a fluid permeable consolidated sand, and recovering oil from said formation through said formed consolidated sand.

2. A method as claimed in claim 1 wherein the aqueous treating solution contains about 20 to about 40 percent by volume of said adipaldehyde.

3. A method as claimed in claim 1 wherein the aqueous treating solution contains from 10 percent to 70 percent by volume of an oxygenated lower molecular weight aliphatic hydrocarbon.

4. A method as claimed in claim 1 wherein said catalyst is selected from the group consisting of benzoyl chloride, benzenesulfonyl chloride and thionyl chloride.

5. A method as claimed in claim 1 wherein said catalyst is benzoyl chloride.

6. A method as claimed in claim 1 wherein the treating solution contains from about 0.5 to 3 percent by volume, basis said adipaldehyde, of gamma-glycidoxypropyltrimethoxysilane as a bonding agent.

7. A method as claimed in claim 1 wherein said treated sand formation is contacted with a petroleum fraction selected from the group consisting of kerosene and diesel oil prior to polymerization of said adipaldehyde.

8. A method as claim in claim 1 wherein said acid catalyst is injected in the formation in a petroleum oil fraction containing from about 1.5 to 5 percent by volume of said catalyst.